Figure 1:
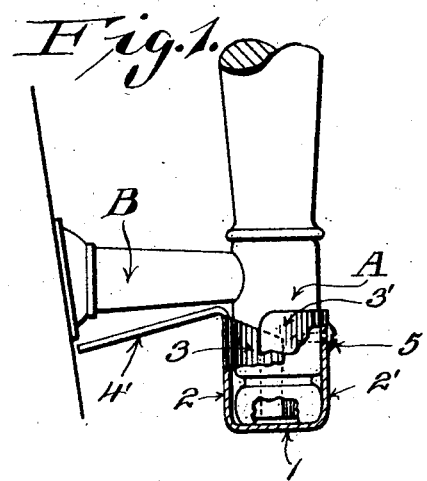

C. G. THRONSON.
VESSEL HANDLE SHIELD.
APPLICATION FILED SEPT. 12, 1921.

1,411,070.

Patented Mar. 28, 1922.

Inventor
Clarence G. Thronson

Witness
T. P. Britt

Young and Young
Attorneys

UNITED STATES PATENT OFFICE.

CLARENCE G. THRONSON, OF DETROIT, MICHIGAN.

VESSEL HANDLE SHIELD.

1,411,070.

Specification of Letters Patent.  Patented Mar. 28, 1922.

Application filed September 12, 1921. Serial No. 499,924.

*To all whom it may concern:*

Be it known that I, CLARENCE G. THRONSON, a citizen of the United States, and resident of Detroit, in the county of Wayne and State of Michigan, have invented certain new and useful Improvements in Vessel Handle Shields; and I do hereby declare that the following is a full, clear, and exact description thereof.

My invention refers to vessel handle shields for wood or fibre handles, of cooking utensils, it being a well known fact that such handles are constantly subjected to the cooking flame or heat, whereby they are charred or burnt, particularly at their lower butt ends.

The primary object of my invention is to provide a one-piece ductiled metallic blank which can be readily folded about the butt of a cooking utensil handle by those unskilled in the art.

Another object of my invention is to provide a ductiled metallic blank for protecting the butt of a cooking utensil handle, which can be stamped from a single piece of metal and thereby manufactured at a minimum cost.

With the above and other minor objects in view, the invention consists in certain peculiarities of construction and combination of parts, as are hereinafter set forth with reference to the accompanying drawing and subsequently claimed.

In the drawings,

Figure 1 represents a fragmentary view of a vessel and lower portion of its handle, having affixed thereto, a shield embodying the features of my invention, the shield being partly broken away to more clearly illustrate the details of construction.

Figure 2:
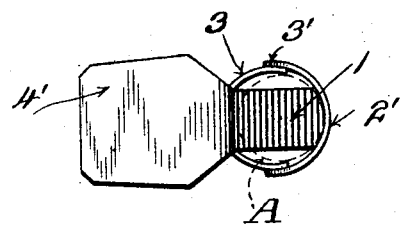

Figure 2, a plan view of the shield, showing the handle butt in dotted lines.

Figure 3:
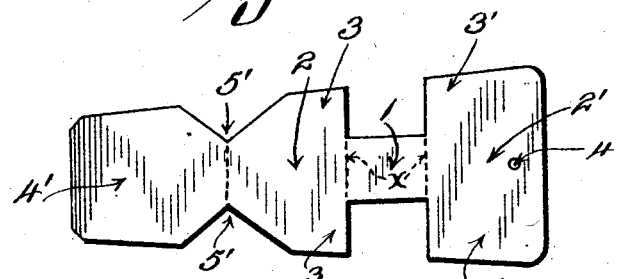
Figure 4:
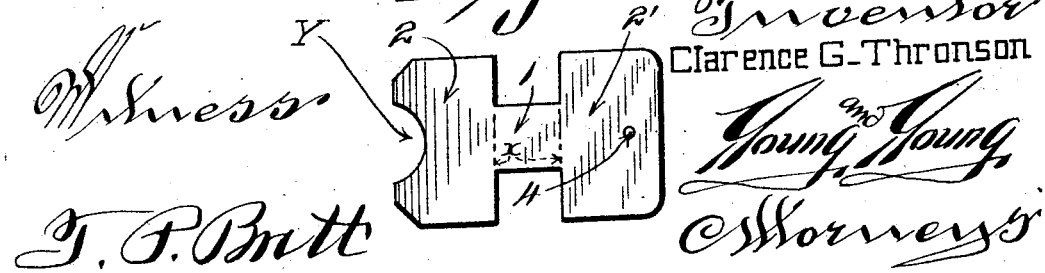

Figure 3, a face view of a shield blank, illustrating the same flattened out, or before it is folded about the butt of the handle, and Figure 4, a similar view of the blank, somewhat modified in form.

Referring by characters to the drawing, with particular reference to Figures 1 to 3 inclusive, 1 represents a narrow base section, having side wing extensions 2—2', which extensions terminate with flange tips 3—3 3'—3', that project beyond the width of the base section. The front wing section 3' is provided with an aperture 4 for the reception of a retaining screw 5, that is in threaded union with the butt A of a vessel handle, as indicated in Figure 1. The side wing 2 is provided with an extension tongue 4', which tongue, as best shown in Figure 1, is arranged to extend towards the vessel and protect the lower supporting arm B of the handle, which arm is suitably connected with the vessel, it being understood that, when the tongue is used, the arm B, as well as the handle A, is of combustible material. The tongue, in this instance, is merged into the top edge of the wing 2, and, at the outer intersecting edges of the tongue and wing, the blank is formed with V-shaped notches 5', whereby the blank is weakened at this point in order that the parts can be conveniently folded in opposite direction.

From the foregoing description, it will be seen that when it is desired to adjust the shield blank to the butt A of a cooking vessel handle, the side wings are folded upwardly upon lines indicated at X in Figure 3, and the tongue 4 is thereafter folded back at approximately a right angle to the position assumed by the wings. Thus the tongue serves as a protecting shield for the cross arm B. The wings 2 and 2', together with their flange tips, are then folded in circular form about the outer wall of the handle butt, whereby said flange tips will form a lapped joint to produce a cup-like shield which will thoroughly protect the butt of the handle from heat or flame. The shield is then confined by the screw 5, which is passed through the aperture 4 and into the fibre of the handle butt.

In some instances where the arm B is of metal, or in cases where said arm is not subjected to the influence of heat, the tongue B may be dispensed with. In this case, the blank assumes the form, as indicated in Figure 4 of the drawings, wherein the tongue is eliminated and the top edge of the side wing 2 is curved inwardly, as indicated at Y, to clear the supporting arm B and snugly fit about the juxtaposed surface thereof. In other respects, this blank is exactly similar to the blank illustrated in Figure 3.

I claim:

1. In a cooking vessel having a vertically disposed handle, the same being secured to the vessel by arms above the butt of said handle; the combination of a ductile sheet metal shield for the handle butt including a narrow base section for shielding the bottom surface of the handle butt, the base section being merged into side wings of greater width than said base section, the side wings being folded upwardly and lapped about the outer surface of the handle butt, forming a cup-like casing therefor, and means for securing said cup-like casing to the butt.

2. As a new article of manufacture, a ductile metallic handle shield for cooking vessels, the shield including a narrow base section, side wings extending therefrom terminating with flanged tips, and a tongue extending from one of the side wings.

In testimony that I claim the foregoing I have hereunto set my hand at Detroit, in the county of Wayne and State of Michigan.

CLARENCE G. THRONSON.